United States Patent Office 3,265,398
Patented August 9, 1966

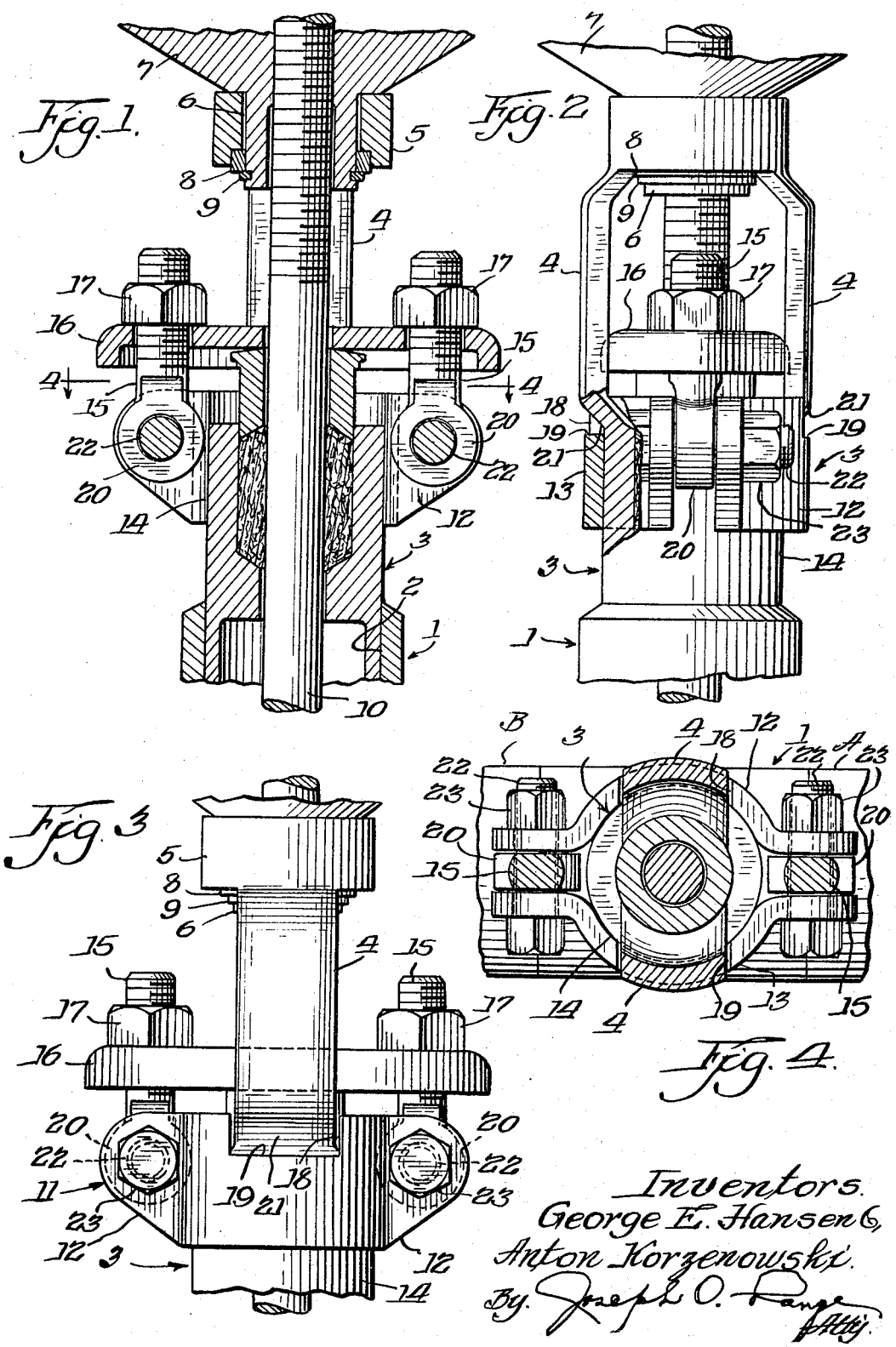

3,265,398
FABRICATED STUFFING BOX WITH GLAND EYE-BOLT ARRANGEMENT
George E. Hansen, Elmwood Park, and Anton Korzenowski, Brookfield, Ill., assignors to Crane Co., Chicago, Ill., a corporation of Illinois
Filed July 25, 1963, Ser. No. 297,638
2 Claims. (Cl. 277—105)

This invention relates generally to a clamp type retaining means for gland bolts and stuffing boxes, and, more particularly, it is concerned with the type of stuffing box and gland construction suitable not only for use on valves, but also for other types of pressure vessels, such as pumps, or the like piston operated devices, in which a reciprocating or rotating or a combined reciprocating and rotating shaft is employed in a fluid tight mounting or bearing.

At the outset, in order to have a better appreciation of the inventive concept involved here, it should be understood that in maintaining or compressing the packing in the stuffing box, frequently the latter is tightened or compressed by means of threaded gland nuts or a gland flange employing stud bolts or eye bolts to compress said packing. The prior objection to such designs, particularly where threaded gland nuts are employed, lies in the expense in maintaining such a stuffing box, and further, in the relatively high torque required in tightening said gland nuts thereby necessitating the use of large and cumbersome wrenches. The latter tools are obviously difficult to handle especially because the operating space between the yoke arms is frequently rather restricted.

An objection to the use of the more easily retained eye bolt designs of the past also lies in the fact that the ears for the eye bolts which are usually positioned on the valve bonnet or on the yoke are difficult to cast and the drilling for anchoring eye bolt pins necessitates an extra machining operation involving the use of costly drilling fixtures.

A further objection to the constructions of the prior art lies in the fact that the conventional eye bolt and designs employed did not permit of mounting the gland bolts sufficiently close to the stem central axis and thus effect beneficially the reduction of the bending moment on the gland flange to a minimum, as well as maintaining flange dimensions to desirable proportions.

A further objection to prior constructions is in the fact that the eye bolt pins in the course of service frequently have become loosened and the gland eye bolts are then easily lost or dropped into inaccessible areas during the packing of the stuffing box.

Accordingly, it is an important object of this invention to provide a gland and stuffing box construction in which the eye bolts employed therefor are advantageously positioned so as to be incapable of becoming loosened and lost.

A further object is to provide for a gland eye bolt mounting in which the eye bolts are securely received and conveniently mounted upon the same retaining means used for tightening a split clamp in holding the latter member together.

Another object in providing for a construction permitting greater compactness in one of several forms affecting the positioning of the gland eye bolts and to provide for a combined yoke and stuffing box construction in which at least a portion of said eye bolts is securely positioned within a recessed portion of the yoke clamp to obtain the compactness referred to.

Another object is to provide for a gland eye bolt construction in which the eye bolts are substantially mounted on the same axis as the clamp bolts employed to draw the split clamp together in effecting the mounting of the said clamp around the stuffing box.

A further object is to provide for a gland eye bolt construction in which the eye bolts cannot be removed except upon removal of the split clamp, the clamp retaining bolts serving as the axis of rotation for the gland eye bolts.

A further important object is to provide a split clamp construction as the retainer means for the gland eye bolts in which the spaced-apart arms of the novel yoke cooperate with the split gland bolt retainer clamp to limit the longitudinal movement of the split members of the retainer clamp when compression is applied by the gland bolts to the packing, the eye bolts being firmly and securely held to the split clamp retaining means by the same bolt means employed to draw said retaining means relatively tightly over a peripheral portion of the combined stuffing box, yoke and bonnet.

Other objects and advantages of the invention will become more readily apparent upon proceeding with the following description read in light of the accompanying drawings, in which:

FIG. 1 is a fragmentary sectional assembly view of a preferred embodiment of our invention;

FIG. 2 is a fragmentary exterior view taken at right angles to FIG. 1;

FIG. 3 is a fragmentary exterior view showing the manner in which the clamp bolt retainer means cooperates with the yoke arms;

FIG. 4 is a sectional view taken on the line 4—4 of FIG. 1.

Similar reference numerals refer to similar parts throughout the several views.

Referring now to FIG. 1, a valve casing generally designated 1 is fragmentarily shown having the usual connections A and B for the usual attachment to a pipe line (not shown). This arrangement is shown more clearly in FIG. 4. As shown in FIG. 1, the upper opening 2 is provided in said casing for receiving the stuffing box member generally designated 3. In this construction, it will be noted, as shown more clearly in FIG. 1, that the stuffing box also serves as the bonnet or cover for the valve. Further, it is also preferably integral with the yoke portion thereof having the oppositely disposed yoke arms 4 as shown more clearly in FIG. 2. At their upper portions, the said yoke arms which form an open through portion as shown are integrally joined as at the yoke hub or annulus 5 to clip over the shank portion 6 of the handwheel 7.

Retention of the handwheel securely within the yoke hub 5 is accomplished by the usual means comprising a washer 8 and a split ring 9 as illustrated.

As shown more clearly in FIG. 3, the separable retainer clamp 11 consists of oppositely disposed clamp halves 12 and 13 having complementary arcuate portions, the latter being snugly received around the shank 14 of the combined bonnet member and stuffing box 3 as previously described. In this construction, however, it should be noted that it is necessary to guard positively against substantial axial movement, especially when the stuffing box is being packed by means of the gland eye-bolts 15 and nuts 17 bearing against the gland flange 16 as shown. For this purpose, the said split clamp retainer halves 12 and 13 for the eye bolts 15 are relieved as shown at 18 whereby to allow the relief defining surfaces 19 of the clamps to bear against the inclined undersurface 21 at the base of the arms 4, shown more clearly in FIGS. 2 and 3.

The valve stem 10 extends through the assembly above described, being journalled within the bonnet stuffing box and threadedly continuing through the handwheel as shown. It will be clear that the respective clamp half members 12 and 13 are securely held in said tightened relation around the peripheral surface 14 of the bonnet and stuffing box by means of the transversely extending bolts 22 and the nuts 23.

In the foregoing construction, the advantage in having the gland eye bolts 15 function pivotally upon removal of the gland nuts 17 whenever it becomes necessary to repack the stuffing box. In addition by this relatively simple and economical expedient of relieving the clamp members 12 and 13 as at 18 and 19 to form an indention or recess for said engagement with the undersurface 21 of the yoke arms 4, compact, durable and positive means are provided for securing the clamp members against substantial longitudinal movement.

It will be appreciated that said members, together with the stuffing box and gland flange, may also be made in fabricated materials for effecting even greater lightness and more economical construction. The construction lends itself to a wide variety of forms and materials without significant limitation, and therefore other modes of applying the principle of the invention may be employed.

We particularly point out and distinctly claim as our invention:

1. In a valve construction or the like for supporting an actuating mechanism, the combination including the assembly of an integral stuffing box, bonnet and yoke, the yoke portion thereof having a pair of spaced-apart arms with a lower portion thereof having inclined under surfaces, gland bolts of eye-bolt configuration for the stuffing box, retainer means for the said gland bolts, the said retainer means comprising a pair of clamp members arranged for engagement with an outer peripheral portion of said integral stuffing box, yoke and bonnet assembly, means for drawing said clamp members together, the said clamp members having relieved upper arcuate portions cooperating with said inclined under surfaces of the arms of said yoke whereby to retain said clamp members upon assembly against longitudinal and rotational movement.

2. In a valve construction or the like for supporting an actuating mechanism therefor, the combination including an integral stuffing box, bonnet and yoke assembly, the yoke portion thereof having a pair of spaced-apart arms, gland bolts of eye-bolt configuration for the stuffing box, retainer means for the said gland bolts, the said retainer means comprising a pair of spaced-apart clamp members for engagement with said integral stuffing box, yoke and bonnet means for drawing said clamp members together, the gland bolts being pivotally mounted on said means for drawing said clamp members together, the said clamp members having upper surface recessed portions normally bearing against outwardly extending lowermost portions of the yoke arms of said yoke whereby to retain said clamp members upon assembly against longitudinal and rotational movement when applying compression loads to said stuffing box.

References Cited by the Examiner

UNITED STATES PATENTS 1,866,292   7/1932   Carlson _____ 277—105 X

SAMUEL ROTHBERG, *Primary Examiner.*